Jan. 10, 1967   E. PANKONIN ET AL   3,296,932
MILLING MACHINE
Filed March 18, 1965   6 Sheets-Sheet 1
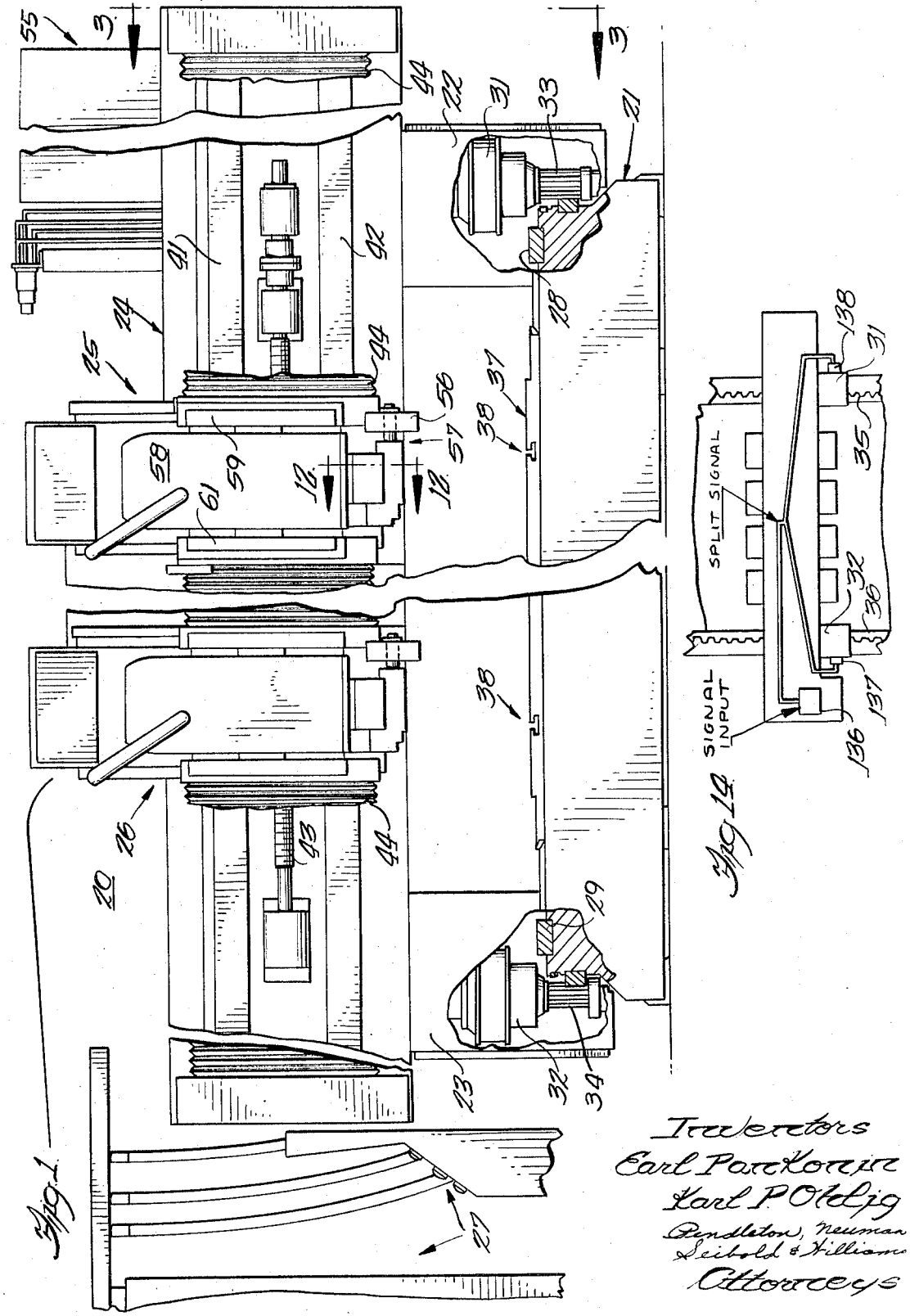
Inventors
Earl Pankonin
Karl P Oleljg
Pendleton, Neuman
Seibold & William
Attorneys Jan. 10, 1967    E. PANKONIN ET AL    3,296,932
MILLING MACHINE
Filed March 18, 1965    6 Sheets-Sheet 2
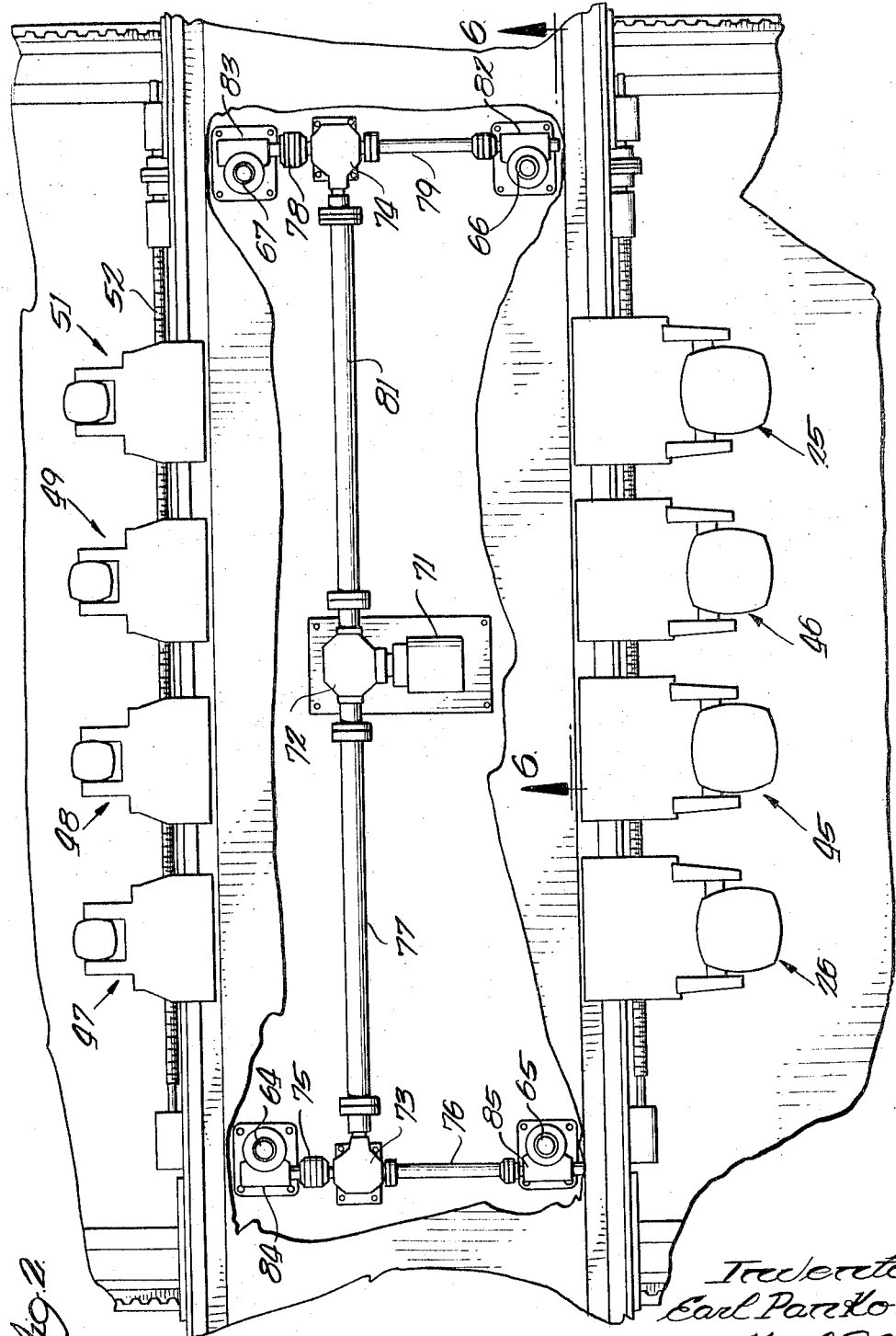

Jan. 10, 1967   E. PANKONIN ET AL   3,296,932
MILLING MACHINE
Filed March 18, 1965   6 Sheets-Sheet 3
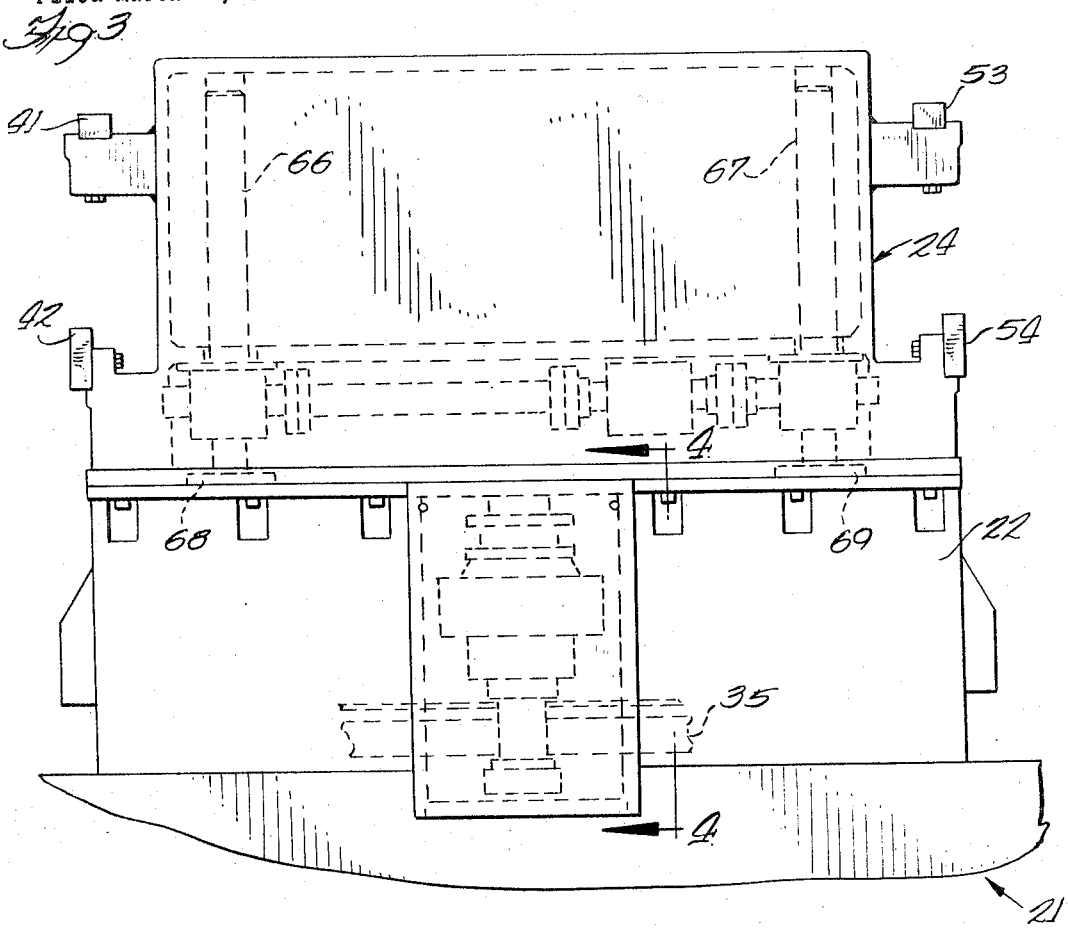
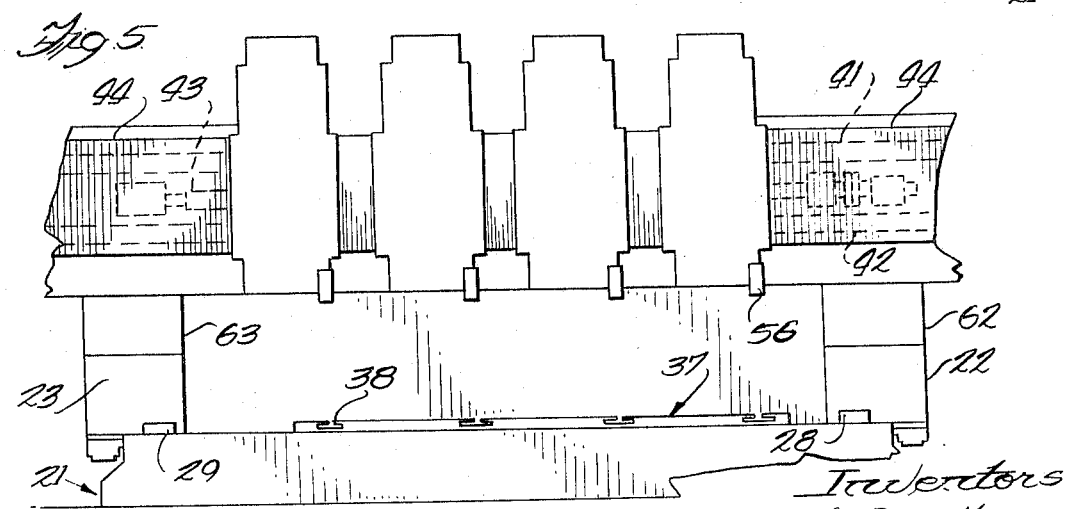

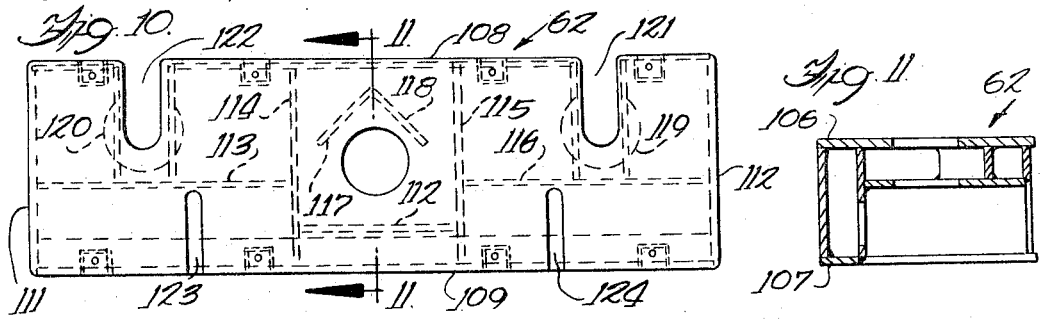
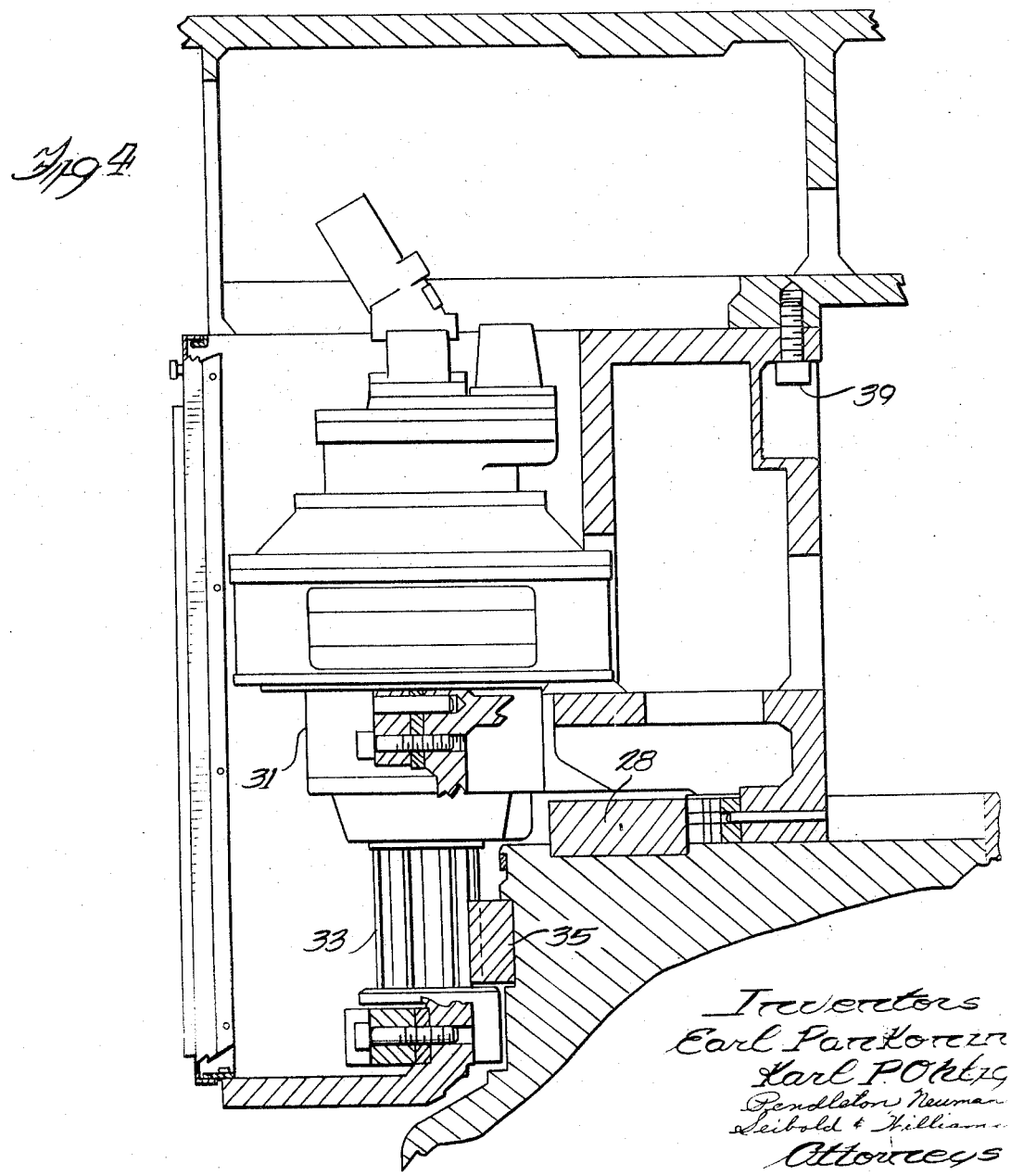

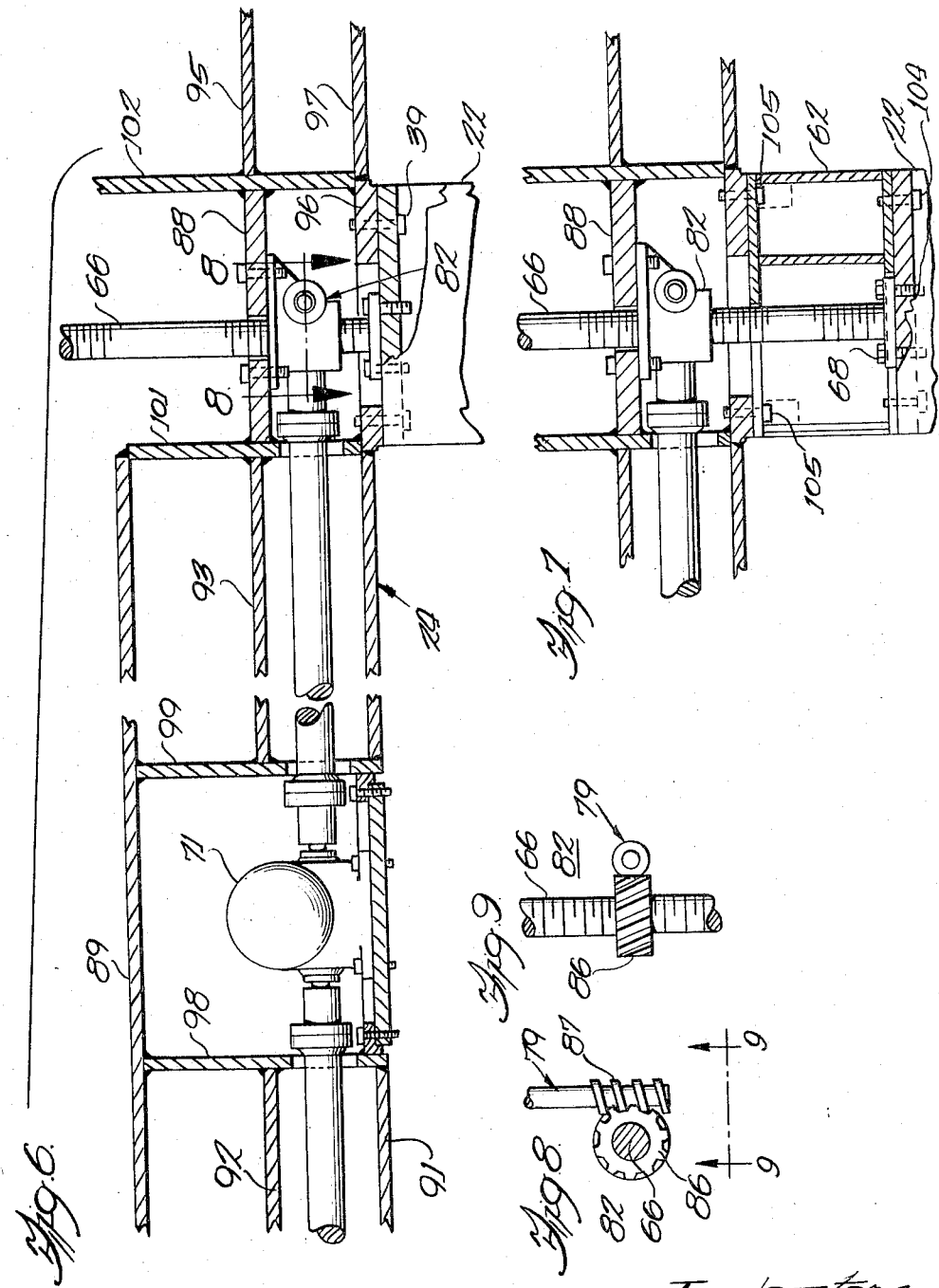

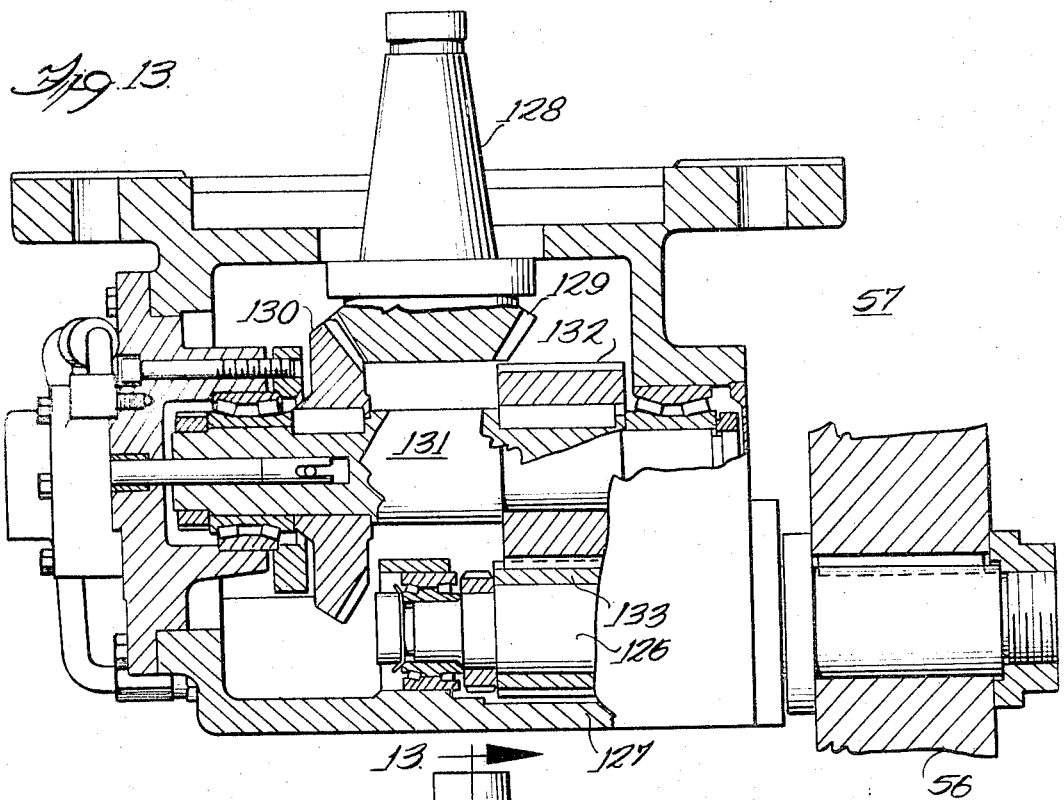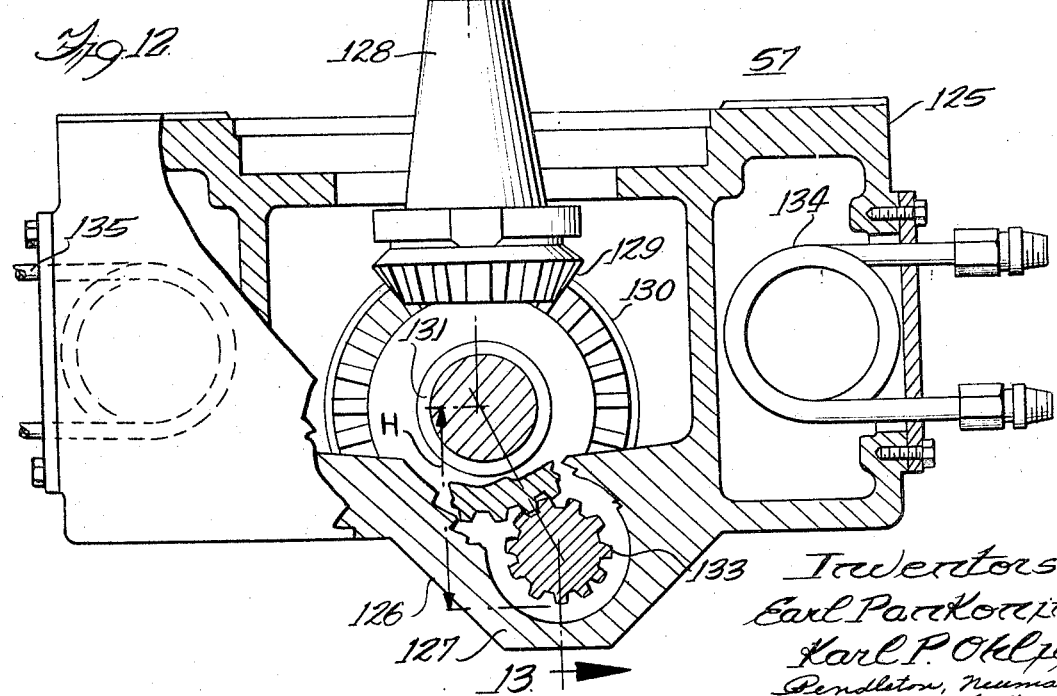

United States Patent Office 3,296,932
Patented Jan. 10, 1967

3,296,932
MILLING MACHINE
Earl Pankonin, Elmwood Park, and Karl P. Ohlig, Chicago, Ill., assignors to Onsrud Machine Works, Inc., Niles, Ill., a corporation of Illinois
Filed Mar. 18, 1965, Ser. No. 440,813
5 Claims. (Cl. 90—15)

This invention relates to massive machine tools, for example, milling machines suitable for machining wing or fuselage panels of high speed aircraft such as those movable at supersonic speeds, and it is an object of the invention to provide improved machine tools of this nature.

One form of milling machine suitable for the indicated purpose is known as a movable gantry milling machine in which the bed of the machine is stationary and the movable gantry comprises a carriage member on each side of the bed and a cross-rail supported by the carriage members. Such a milling machine suitable for milling airplane wings or fuselage panels or parts therefor, for example, may have a bed fifteen or more feet in width and seventy-five or more feet in length. Moreover, such a machine may have several cutting heads mounted on the cross-rail for machining in more than one location at the same time.

In forming wings or fuselage panels for supersonic aircraft, the ribs and reinforcing members are the remaining metal portions after the excess metal has been machined out from a solid piece. The appropriate curved airfoil surface is formed on the side opposite the ribbing by milling excess metal away. All of the indicated operations may be automatically controlled by control systems, some of which are referred to as numerical control, and provide a high degree of accuracy in the milling operations, for example, of the order of fractions of a thousandth of an inch.

The total of the requirements for milling machines of the character indicated is one of high accuracy, physical massiveness and large weight. The cross-rail alone may weight many tons.

Heretofore, movable gantry milling machines have had a fixed position of the cross-rail with respect to the carriage. The vertical movement of the cutting tools, as necessary, was provided by the tool holding and operating mechanisms referred to as heads.

It is a further object of the invention to provide improved vertical positioning apparatus for the cross-rail of a gantry type milling machine of the character indicated.

It is a further object of the invention to provide, in gantry type milling machines of the character indicated, an improved right angle driving mechanism for cutting tools whose axis is essentially parallel to the plane of the work whereby maximum depth of cut of the cutting tool is obtainable.

Further objects of the invention will become apparent as the description proceeds.

In carrying out the invention in one form there is provided, in combination with a milling machine having a stationary machine bed, a carriage mounted on such bed and longitudinally movable relative thereto, such carriage including two members one each of which is movably disposed on each side of said bed, and a tool head carrying cross-rail mounted adjacent each end on one of said two members; apparatus for vertical positioning of such cross-rail on the members of such carriage comprising four vertical screw members disposed at four selected locations within such cross-rail, two each of such locations being at each member of such carriage, two bases on each of such members for receiving the lower ends of two of said screws, four screw-nut members attached to such cross-rail at said four locations and engaged with respective ones of said screw members, drive motor means, drive mechanism connected between said motor means and said screw-nut members for simultaneously driving said screw-nut members upon energization of said motor means, spacer members for disposition between the upper portions of such carriage members and the corresponding lower surfaces of such cross-rail, and a right angle drive mechanism for providing maximum clearance between the wall of the drive housing and the edge of an exterior cutting tool whose axis is essentially parallel to the intended work surface comprising a housing including walls, input shaft and an input gear at the inner end thereof, a first transverse shaft in said housing at right angles to said input shaft, a first gear on said first transverse shaft adapted to be driven by said input gear for driving said first transverse shaft, a second gear on said first transverse shaft adapted to be driven thereby, a second transverse shaft in said housing parallel to said first transverse shaft and adjacent the housing wall, a third gear on said second transverse shaft for driving thereof and meshing with said second gear, said second transverse shaft protruding exteriorly of said casing and being adapted to receive a cutting tool, the diameter of said first gear being no greater than the input axial distance between the axis of said first transverse shaft and the outer extremity of said third gear, said housing wall adjacent said second shaft being essentially free of any exterior protuberances.

For a more complete understanding of the invention reference should be had to the accompanying drawings, in which:

FIG. 1 is a front view partially broken away of a milling machine embodying the invention;

FIG. 2 is a top view partially broken away and on a reduced scale of the machine shown in FIG. 1;

FIG. 3 is a fragmentary end view partially broken away taken in the direction of the arrows 3—3 of FIG. 1;

FIG. 4 is a sectional view partially broken away of drive mechanism taken in the direction of arrows 4—4 of FIG. 3;

FIG. 5 is a front view similar to FIG. 1 somewhat schematic and showing the cross-rail in a different operative position;

FIG. 6 is a sectional view partially broken away taken in the direction of arrows 6—6 of FIG. 2;

FIG. 7 is a sectional view partially broken away similar to FIG. 6 but showing the cross-rail in the position of FIG. 5;

FIG. 8 is a fragmentary sectional view taken substantially in the direction of arrows 8—8 of FIG. 6;

FIG. 9 is an end view taken in the direction of arrows 9—9 of FIG. 8;

FIG. 10 is a top view of one of the operative components of apparatus according to the invention;

FIG. 11 is a sectional view taken in the direction of arrows 11—11 of FIG. 10;

FIG. 12 is a sectional view on an enlarged scale taken in the direction of arrows 12—12 of FIG. 1;

FIG. 13 is a sectional view taken in the direction of arrows 13—13 of FIG. 12; and FIG. 14 is a schematic diagram of the drive control apparatus applicable to the machine of FIG. 1.

Referring to the drawings, the invention is shown in a milling machine 20 including a bed 21, a carriage including two carriage members 22 and 23, a cross-rail 24 mounted on the carriage members, a series of cutting tool heads of which two, 25 and 26, are shown in FIG. 1, and control mechanism 27.

The bed 21 is a rigid, massive metallic member adapted to be supported upon a suitable foundation, and is provided on its upper surface with a pair of hardened metallic guideways 28 and 29 upon which longitudinal motion of the gantry, including the carriage members 22 and 23 and the cross-rail 24, takes place, the carriage members 22 and 23 being provided with appropriate bearings (not illustrated) for this purpose. The gantry is driven longitudinally at each side of the machine bed by means of motors 31 and 32 which drive pinions 33 and 34 engaging with racks 35 and 36 attached along the sides of the machine bed. The motors 31 and 32 may be hydraulic or electric or other type and are attached to the carriage members 22 and 23, respectively. The bed 21 includes a work holding surface 37 which includes T slots 38, for example, for receiving work holding clamp members.

The cross-rail 24 is solidly attached to carriage members 31 and 32 by suitable means, such as screws 39, as may be seen best in FIGS. 3 and 4, and includes a pair of transverse guideways 41 and 42 upon which the tool heads 25 and 26, and others, may move under the influence of a motor driven lead screw 43. As shown, the lead screw engages each of the heads 25 and 26 and will drive them in the same direction at the same time. A flexible bellows structure 44 is provided to cover the guideways 41 and 42, lead screw 43, and other parts, in order to avoid contamination thereof by dust, metal chips and the like.

Referring to the top view of FIG. 2, one form of machine actually constructed, according to the invention, included a total of eight cutting tool heads. These heads, in addition to heads 25 and 26, already identified, may be identified by the reference characters 45, 46, 47, 48, 49 and 51. The heads 45 and 46 are also driven by the lead screw 43, whereas the heads 47, 48, 49 and 51 may be driven simultaneously by a second lead screw carried on the cross-rail 24 by mechanism shown schem- 52 along guideways 53 and 54 (FIG. 3). In the actual machine constructed, the cutting tools associated with heads 25, 26, 45 and 46 were adapted to operate cutting tools on horizontal axes, as will be more particularly described subsequently in this specification, and the cutting tools associated with heads 47, 48, 49 and 51 were adapted to operate on vertical axes. In this manner, a wide variety of milling operations can be accommodated on one machine through automatic control without the necessity for stopping the operation for tool changes.

Control and service conductors, conduits, etc. are carried on the cross-rail 24 by mechanism shown schematically by the reference character 55, and from this mechanism the conduits, conductors, etc. extend to each of the heads 25, 26, 45, 46, 47, 48, 49 and 51 as is well understood. Control of the complete machine is carried out by the apparatus shown schematically by the reference character 27 which may include a console of instruments and the like for operation by an operator and may be carried on a suitable carriage movable with the carriage members 22, 23 and the cross-rail 24, also as is well understood in this art.

The cutting tool 56 associated with head 25 has a horizontal axis and is driven through a suitable right angle gear mechanism 57 with similar tools for the heads 26, 45 and 46.

Vertical adjustments of the cutting tool 56 and head 25, for example, during regular milling operations, takes place by means of vertical movements of the motor unit 58 on guideways 59 and 61, as is well understood, similar vertical guideways being provided for the other heads. The space between the flutes of cutting tool 56 and the worktable surface 37 is substantial and may be of the order of eighteen to twenty inches. The effective adjustment of the cutting tool position may be enlarged through the invention by providing vertical spacers to be used in connection with the carriage members 22 and 23 and appropriate lift mechanism for raising the cross-rail 24. In FIG. 5, two vertical spacers 62 and 63 and the remaining portions of the machine are shown schematically. In FIGS. 2, 3, 6 and 7, the lift and spacer mechanisms are shown to provide for the vertical positioning of the cross-rail 24.

The cross-rail lift mechanism includes a series of four screws 64, 65, 66 and 67, rectangularly disposed so that two each of the screws bear on each of the carriage members 22 and 23. Thus, as may be seen by the broken lines in FIG. 3, the screws 66 and 67 have footings or bases 68 and 69 which bear on carriage member 22 (see also FIG. 6). Similarly, the screws 64 and 65 have footings or bases bearing on the carriage member 23. A single motor 71 which may be electric, hydraulic or other type, drives each of the screws 64, 65, 66 and 67 simultaneously through appropriate right angle gear boxes 72, 73 and 74, and appropriate shafts 75, 76, 77, 78, 79 and 81. At each location within the cross-rail 24, for example, the location associated with screw 66, there is a worm gear screw drive mechanism 82, others being 83, 84 and 85.

Referring to the worm gear screw drive mechanism 82, it will be noted that the screw 66 is threadedly received inside of a gear 86, the outer periphery of which has worm gear teeth cut thereon to cooperate with the worm gear 87 at the end of shaft 79. Thus, when the shaft 79 rotates, the worm 87 drives gear 86 which turns around the stationary screw 66 to raise or lower the housing of worm gear screw drive mechanism 82. The cross-rail 24 is thus raised because the housing of mechanism 82 is attached to the plate 88. Reverse operation of the shaft 79 will cause the mechanism 82 and the cross-rail 24 to move downwardly as will be understood. Identical operation, of course, occurs at each of the screws 64, 65 and 67 so that the cross-rail 24 moves upwardly or downwardly uniformly. The footing 68 of screw 66 and similar footings of screws 64, 65 and 67 are attached by screws to the top of the carriage members as may be seen, for example, in FIG. 6.

The cross-rail 24, as has already been indicated, is a massive member and may be formed in any suitable manner having regard to obtaining the requisite strength and rigidity. In one form of such member, various pieces of steel were welded together and in FIGS. 6 and 7 certain such steel members are shown welded in a partial showing of a typical cross-rail. The specific construction of a cross-rail including such transverse members 88, 89, 91, 92, 93, 95, 96 and 97 and vertical members 98, 99, 101, and 102, which are part of the total construction, is only partially illustrated inasmuch as many sufficiently rigid forms may be made.

In FIG. 6 the cross-rail 24 is shown resting on carriage member 22, being attached thereto by screws 39, as shown. This position of the cross-rail is the same as shown in FIG. 1 and is the lowest position that the cross-rail may have. When it is desired to raise the cross-rail 24 to a higher position, the motor 71 is energized. Such energization, by virtue of the shaft and gear mechanisms described, will cause the cross-rail 24 to move upwardly. At a sufficient height of the cross-rail, the spacers 62 and 63 are inserted as may be seen in FIGS. 5 and 7, the spacers being of a desired height, for example, in the vicinity of fifteen inches in one form of machine. After the spacers 62 and 63 are inserted and attached to the carriage members 22 and 23 by suitable screws 104, the motor 71 is energized in the reverse direction to allow the cross-rail to settle down upon the upper surface of spacers 62 and 63, whereupon the cross-rail and the spacers are attached together by means of screws 105. The cross-rail in its new position is now ready to function in the same manner as before with the various cutting tools spaced an additional height above the work.

More than one spacer at each end of the cross-rail may be used, if desired, two being used in one form of the machine thereby making a total additional upward spacing of the cross-rail of thirty inches.

In a moving gantry type of milling machine, the attachment between the cross-rail 24 and the carriage members 22 and 23 and the spacers 62 and 63, when used, must be very rigid in order to provide the machining accuracy desired. For this reason, the vertical screws 64, 65, 66 and 67 do not provide any vertical holding force for the cross-rail during operation, but provide only a lifting or lowering effort for positioning purposes. Thereafter the rigid bolting of the cross-rail to the spacers and the spacers to the carriage provides the necessary rigidity.

Referring to FIGS. 10 and 11, the spacer 62, which is identical to spacer 63, except for difference due to end position, is shown as a rectangular parallelepiped formed of cellular internal construction. Thus, the spacer member may comprise top and bottom members 106 and 107, two side members 108 and 109, two end members 111 and 112 and various internal members 113, 114, 115, 116, 117, 118, etc. The bottom member 107 is provided with generally circular cutouts 119 and 120 for receiving the footings 69 of the vertical lift screws and the top and bottom members 106 and 107 each include slots 121 and 122 through which the vertical screws pass when the spacer 62 is slid into position. Alignment grooves 123 and 124 or the like may be provided to cooperate with keys to insure proper alignment of the spacers 62 and 63, relative to the carriage members and the cross-rail. Any form of spacer 62 which is sufficiently strong, rigid and accurate, may be utilized.

Full advantage of the vertical positionability of the cross-rail 24 in machining various thicknesses of work and in various depths of cut is obtained through the improved right angle drive mechanism 57, by means of which the maximum depth of cut with a tool may be made. Referring to FIGS. 12 and 13, it will be observed that there are no protuberances extending below that portion of the housing 125 below the output shaft 126. The shaft 126 is mounted as closely to the lower portion 127 of the housing 125 as the necessary bearings and gear teeth will permit. In this manner, a very substantial portion of the radius of the cutting tool 56 is available for the depth of cut.

The right angle drive mechanism in addition to the housing 125 and output shaft 126 comprises an adapter 128, angular gears 129 and 130, a transverse shaft 131, and gears 132 and 133. The adapter 128 is receivable within an appropriate drive member forming part of the head 58. The angular gear 129 may be an integral part of the adapter 128 and, thus, be driven by the head 58. Angular gear 129 meshes with angular gear 130 which is keyed, as shown, to shaft 131 mounted at right angles to the axis of adapter 128. Also keyed, as shown, to shaft 131 is the gear 132 which in turn meshes with the gear 133 either keyed to shaft 126 or formed directly on its surface. The axis of the shaft 126 is parallel to the axis of shaft 131 and forms the output shaft of the right angle drive. Thus, it may be seen that driving the adapter 128, by virtue of the meshing of the gears 129 and 130 and the meshing of the gears 132 and 133, drives the output shaft 126 and, thus, the cutting tool 56.

In order that the greatest radial extent of the cutting tool 56 is available for cutting purposes, the gear 133 must be as small radially as possible consistent with necessary strength and must be mounted as closely as possible to the lower edge 127 of the housing. Appropriate gear ratios must be selected to give the desired rotational speed of cutting tool 56 in relationship to the rotational speed of adapter 128. In any event, the radius of gear 130 must be such that it does not extend below the lowermost portion of gear 133 in order that no protuberances on the lower portion of the housing are necessary. In order to bring the axis of shaft 126 closer vertically to the axis of shaft 131 in order to take advantage of the space provided by the radius of gear 130, the axis of shaft 126 may be displaced laterally from the vertical axis of the adapter 128, as may be seen best in FIG. 12. The axis of shaft 126 may be displaced laterally by an amount not exceeding that which brings the lowermost surface of gear 133 to the lowermost surface of gear 130. The vertical spacing H between the center of shaft 131 and the lowermost surface of gear 133, being measured along the extended axis of adapter 128 or input shaft, may be referred to as an input axial distance. In this manner, the vertical thickness of the right angle drive is made less and the total available space for placement of work beneath the cutting tool is increased.

Projecting inwardly from each side of the housing 125, there are coils 134 and 135 which provide cooling for the right angle gear mechanism.

In FIG. 14 the machine, according to the invention, is shown schematically including the drive racks 35 and 36. Drive signals from a common signal source 136, which may be of the numerical control variety, are split or divided and an equal signal sent to each of the drive motors 31 and 32. Feed-back members 137 and 138 may be driven by the carriage as the gantry moves along and generate signals which are compared with the split or divided signal sent from the numerical control. In this manner, highly accurate driving of the machine from both sides is achieved. Similarly, a single signal from the numerical control may be split or divided and sent to each of the mechanisms controlling the vertical position of the various heads.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. In combination with a milling machine having a relatively longitudinally movable machine bed and a carriage having members disposed at opposite sides of said bed, and a tool carrying cross-rail mounted adjacent each end on a member of such carriage; apparatus for vertical positioning of such cross-rail on the members of such carriage comprising four vertical screw members disposed at four selected locations within such cross-rail, two each of such locations being at each member of such carriage, two bases on each of such members for receiving the lower ends of two of said screws, four screw-nut members attached to such cross-rail at said four locations and engaged with respective ones of said screw members, drive motor means, drive mechanism connected between said motor means and said screw-nut members for simultaneously driving said screw-nut members upon energization of said motor means, and spacer members for disposition between the upper portions of such carriage members and the corresponding lower surfaces of said cross-rail.

2. In combination with a milling machine having a relatively lonigtudinally movable machine bed and a carriage having members disposed at opposite sides of said bed, and a tool carrying cross-rail mounted adjacent each end on a member of such carriage; apparatus for vertical positioning of such cross-rail on the members of such carriage comprising four vertical screw members disposed at four selected locations within such cross-rail, two each of such locations being at each member of such carriage, two bases on each of such members for receiving the lower ends of two of said screws, four screw-nut members attached to such cross-rail at said four locations and engaged with respective ones of said screw members, drive motor means, drive mechanism connected between said motor means and said screw-nut members for simultaneously driving said screw-nut members upon energization of said motor means, spacer members for disposition between the upper portions of such carriage members and the corresponding lower surfaces of said cross-rail, and means for attaching said spacer members to such carriage members and to such cross-rail.

3. In combination with a milling machine having a stationary machine bed, a carriage mounted on such bed and longitudinally movable relative thereto, such carriage including two members one each of which is movably disposed on each side of said bed, and a tool carrying cross-rail mounted adjacent each end on one of said two members; apparatus for vertical positioning of such cross-rail on the members of such carriage comprising four vertical screw members disposed at four selected locations within such cross-rail, two each of such locations being at each member of such carriage, two bases on each of such members for receiving the lower ends of two of said screws, four screw-nut members attached to such cross-rail at said four locations and engaged with respective ones of said screw members, drive motor means, drive mechanism connected between said motor means and said screw-nut members for simultaneously driving said screw-nut members upon energization of said motor means, and spacer members for disposition between the upper portions of such carriage members and the corresponding lower surfaces of said cross-rail.

4. In combination with a milling machine having a stationary machine bed, a carriage mounted on such bed and longitudinally movable relative thereto, such carriage including two members one each of which is movably disposed on each side of said bed, and a tool carrying cross-rail mounted adjacent each end on one of said two members; apparatus for vertical positioning of such cross-rail on the members of such carriage comprising four vertical screw members disposed at four selected locations within such cross-rail, two each of such locations being at each member of such carriage, two bases on each of such members for receiving the lower ends of two of said screws, four screw-nut members attached to such cross-rail at said four locations and engaged with respective ones of said screw members, drive motor means, drive mechanism connected between said motor means and said screw-nut members for simultaneously driving said screw-nut members upon energization of said motor means, spacer members for disposition between the upper portions of such carriage members and the corresponding lower surfaces of said cross-rail, and means for attaching siad spacer members to such carriage members and to such cross-rail.

5. In combination with a milling machine having a stationary machine bed, a carriage mounted on such bed and longitudinally movable relative thereto, such carriage including two members one each of which is movably disposed on each side of such bed, and a tool carrying cross-rail mounted adjacent each end on one of such two members; apparatus for vertical positioning of such cross-rail on the members of such carriage comprising, a plurality of vertical lift members attached to such cross-rail and bearing on such carriage members, means for controlling said lift members to simultaneously lift said cross-rail, spacer means for disposition between such carriage members and cross-rail for spacing such cross-rail, and means for attaching said spacer means to such carriage members and to such cross-rail.

References Cited by the Examiner
UNITED STATES PATENTS

| | | | |
|---|---|---|---|
| 724,514 | 4/1903 | Sellers | 90—37 |
| 771,817 | 10/1904 | Flather | 90—37 |
| 1,775,084 | 9/1930 | Beaman. | |
| 2,081,288 | 5/1937 | Armitage. | |
| 2,106,836 | 2/1938 | Forward | 90—16 X |
| 3,175,466 | 3/1965 | Capaul | 90—37 X |

WILLIAM W. DYER, JR., *Primary Examiner*